United States Patent
Qin et al.

(10) Patent No.: US 11,926,725 B2
(45) Date of Patent: Mar. 12, 2024

(54) FLAME-RETARDANT HIPS MATERIAL AND PREPARATION METHOD THEREOF

(71) Applicant: KINGFA SCI. & TECH. CO., LTD., Guangdong (CN)

(72) Inventors: Wangping Qin, Guangdong (CN); Jinfeng Fu, Guangdong (CN); Peng Xiao, Guangdong (CN); Xianbo Huang, Guangdong (CN); Nanbiao Ye, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 193 days.

(21) Appl. No.: 17/286,494

(22) PCT Filed: Oct. 30, 2019

(86) PCT No.: PCT/CN2019/114369
§ 371 (c)(1),
(2) Date: Apr. 19, 2021

(87) PCT Pub. No.: WO2020/108217
PCT Pub. Date: Jun. 4, 2020

(65) Prior Publication Data
US 2022/0411610 A1    Dec. 29, 2022

(30) Foreign Application Priority Data

Nov. 30, 2018   (CN) .......................... 201811459227.7

(51) Int. Cl.
| | | |
|---|---|---|
| *C08K 13/02* | (2006.01) | |
| *B29B 7/00* | (2006.01) | |
| *B29B 7/46* | (2006.01) | |
| *B29B 7/82* | (2006.01) | |
| *B29B 9/06* | (2006.01) | |
| *B29C 45/00* | (2006.01) | |
| *B29K 9/06* | (2006.01) | |
| *B29K 105/00* | (2006.01) | |

(52) U.S. Cl.
CPC .............. *C08K 13/02* (2013.01); *B29B 7/007* (2013.01); *B29B 7/46* (2013.01); *B29B 7/823* (2013.01); *B29B 9/06* (2013.01); *B29C 45/0001* (2013.01); *B29K 2009/06* (2013.01); *B29K 2105/0026* (2013.01); *B29K 2995/0016* (2013.01)

(58) Field of Classification Search
CPC ........... C08K 13/02; B29B 7/007; B29B 7/46; B29B 7/823; B29B 9/06; B29C 45/0001
See application file for complete search history.

(56) References Cited

U.S. PATENT DOCUMENTS

| | | | | |
|---|---|---|---|---|
| 2004/0242736 A1* | 12/2004 | Onishi | ................... | C08K 5/03 524/104 |
| 2007/0173569 A1* | 7/2007 | Onishi | ................... | C08K 5/06 524/464 |
| 2011/0313069 A1 | 12/2011 | Onishi et al. | | |
| 2013/0053482 A1* | 2/2013 | Narayan | ................. | C08L 71/12 524/371 |
| 2013/0190439 A1* | 7/2013 | Delahaut | ............. | C08K 5/3467 524/394 |

FOREIGN PATENT DOCUMENTS

| | | | | |
|---|---|---|---|---|
| CN | 1487970 | | 4/2004 | |
| CN | 1487971 | | 4/2004 | |
| CN | 102604246 | | 7/2012 | |
| CN | 103992571 | | 8/2014 | |
| CN | 106189034 | | 12/2016 | |
| CN | 106633580 | | 5/2017 | |
| CN | 106751336 | | 5/2017 | |
| CN | 109705507 | | 5/2019 | |
| EP | 1036815 A1 * | | 9/2000 | ............... C08K 3/32 |
| EP | 2354181 | | 8/2011 | |
| GB | 1377282 A * | | 12/1974 | ............... C08K 5/02 |
| WO | WO-2009012645 A1 * | | 1/2009 | ........... C08K 5/3492 |

OTHER PUBLICATIONS

English machine translation of WO 2009/012645. (Year: 2009).*
"International Search Report (Form PCT/ISA/210) of PCT/CN2019/114369," dated Feb. 1, 2020, with English translation thereof, pp. 1-8.

* cited by examiner

*Primary Examiner* — John E Uselding
(74) *Attorney, Agent, or Firm* — JCIPRNET

(57) ABSTRACT

Disclosed is a flame-retardant HIPS material and a preparation method thereof, comprising the following components: 90 parts to 67 parts of a HIPS resin; 8 parts to 15 parts of a brominated flame retardant; and 3 parts to 7 parts of an auxiliary flame retardant; wherein the auxiliary flame retardant is a 1,3,5-triazine compound. In the present invention, a synergistic compounding of the brominated flame retardant and the auxiliary flame retardant effectively reduces an amount of the brominated flame retardant, and a stable UL 94 (1.5 mm) V-0 flame-retardant class can be achieved. Compared with the existing brominated flame-retardant HIPS, the present invention has a low halogen content, low gas, and high cost performance ratio, which avoids excessive acid gas from forming air lines on the surface of parts, has a good appearance.

16 Claims, No Drawings

FLAME-RETARDANT HIPS MATERIAL AND PREPARATION METHOD THEREOF

CROSS-REFERENCE TO RELATED APPLICATION

This application is a 371 of international application of PCT application serial no. PCT/CN2019/114369, filed on Oct. 30, 2019, which claims the priority benefit of China application no. 201811459227.7, filed on Nov. 30, 2018. The entirety of each of the above mentioned patent applications is hereby incorporated by reference herein and made a part of this specification.

BACKGROUND

Technical Field

The present invention relates to the field of flame-retardant polymer materials, and specifically relates to a flame-retardant HIPS material and a preparation method thereof.

Description of Related Art

Flame-retardant HIPS resin is widely used in audio-visual equipment housings, office equipment housings, household appliances, power conversion devices and other fields due to its good mechanical performance, processing and post-processing performances, good dimensional stability and relatively low molding shrinkage.

There are two kinds of flame-retardant HIPS technologies at present, one is a halogen flame-retardant system, and the other is a halogen-free flame-retardant system. The halogen-free flame-retardant system is more environment-friendly, and has weak corrosiveness to mold and less gas, but it has a relatively high material cost and processing energy consumption, which limits a widespread use and promotion in the market. A usual halogen flame-retardant HIPS material contains a HIPS resin, a halogenated flame retardant, an antimony oxide or salt, an anti-dripping agent, an antioxidant, a lubricant and other necessary processing aids, and a product with balanced rigidity, fluidity and toughness can be produced. However, a high content of the halogenated flame retardant results in that the material will generate more hydrogen halide gas due to thermal decomposition during the molding process. Such acid gas will form air lines on the surface of parts, influencing the appearance of the parts.

SUMMARY

In order to overcome disadvantages and defects of the prior art, an objective of the present invention is to provide a flame-retardant and stable low-halogen flame-retardant HIPS material with a good appearance.

The present invention is realized by the following technical solutions.

A flame-retardant HIPS material includes the following components in parts by weight:

| | |
|---|---|
| a HIPS resin | 90 parts to 67 parts; |
| a brominated flame retardant | 10 parts to 15 parts; and |
| an auxiliary flame retardant | 3 parts to 7 parts; | wherein the auxiliary flame retardant is a 1,3,5-triazine compound.

The 1,3,5-triazine compound is a chemical substance or a derivative having the following structure:

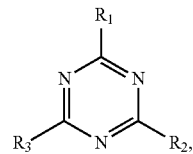

wherein $R_1$, $R_2$, $R_3$ are the same and each independently represents —$P(C_6H_5)_2$, —$P(CH_3)_2$, —$PH_2O_4$, —$PH_2O_2$, —$SiH_3$, —$SiCl_3$, —$SiOH_2$, —$SiHCl_2$, —$SiHO_3$, —$((CH_3)_5Si)_2O$, —$NHR$, —$NR_2$, —$NCH$, —$NO_3$, —$NH_2$, —$NCO$, —$N(CH_3)$ or —$N_2Cl$.

The HIPS resin is a butadiene-styrene graft copolymer with a rubber content of 7 wt % to 11 wt % based on a total weight of the entire HIPS resin, and a melt flow rate of 5 g/min to 15 g/min under a load of 5 kg at 200° C.

The brominated flame retardant is one of or a mixture of more of decabromodiphenyl ethane, brominated epoxy, tetrabromobisphenol A, tris(tribromophenoxy)triazine, octabromoether and imine bromide.

According to actual performance needs, the flame-retardant HIPS material of the present invention further includes 1 part to 7 parts of an antimony-based flame-retardant synergist, 0.01 part to 2 parts of an anti-dropping agent, and 0 part to 2 parts of a processing aid in parts by weight.

The antimony-based flame-retardant synergist is one or more of diantimony trioxide, diantimony pentoxide, sodium antimonate and antimony phosphite. The anti-dropping agent is a perfluoropolyolefin or a perfluoropolyolefin coated with styrene-acrylonitrile. The processing aid is one or more of an antioxidant, a lubricant and an anti-photothermal oxidant.

The antioxidant is a compound of a hindered phenolic primary antioxidant and a phosphite ester auxiliary antioxidant.

The anti-photothermal oxidant is one of or a mixture of more of alkylated hindered polyphenols, hindered monophenols, amines, phosphite esters and hydroxybenzotriazole.

The lubricant is one of or a mixture of more of aliphatic amides, fatty acids or salts thereof, white mineral oil, silicone oil and polysilicone.

Preferably, based on a total weight of the flame-retardant HIPS material, a phosphorus element weight content is 30 ppm to 3,000 ppm and a nitrogen element weight content is 500 ppm to 50,000 ppm.

In particular, a test method of the phosphorus element weight content is: taking 0.4 g to 0.6 g of a sample particle to be tested and placing in a round-bottom flask, adding 10 ml of concentrated $H_2SO_4$ and 5 ml of $H_2O_2$, placing on an electric heating plate at 480° C. for digestion until a complete carbonization, which requires 35 minutes to 45 minutes; after carbonization, cooling for 5 minutes, then adding an appropriate amount of $H_2O_2$, judging whether the carbonization is completed, if not, continuing to add $H_2O_2$ until the carbonization is completed, then cooling in a 100 ml volumetric flask and adding to a constant volume, filtering, centrifuging to take a supernatant, then performing an inductively coupled plasma emission spectroscopy test ICP, and rounding a value to ten digits.

A test method of the nitrogen element weight content is: adopting a Kjeldahl nitrogen determination method, adding 1.0 mL of a protein solution with an appropriate concentration in a flask, adding an analysis sample to a bottom of the flask, adding 0.3 g of potassium sulfate-copper sulfate, 2.0 mL of concentrated sulfuric acid, and 1.0 mL of 30.0% hydrogen peroxide in sequence, bringing to boil over low heat until the substance in the flask becomes carbonized and blackened, performing distillation and absorption of an inorganic nitrogen standard sample, performing distillation and absorption of a sample to be tested and a blank sample, after the samples are processed, performing a titration with 0.0100 mol/L of a standard hydrochloric acid solution by using an acid microburette, recording a number of milliliter of the standard hydrochloric acid solution for each titration, finally calculating the nitrogen element content of the sample to be tested, and rounding a value to ten digits.

The present invention also provides a preparation method of the above-mentioned flame-retardant HIPS material, including the following steps:

a, fully mixing raw materials of each component according to a ratio in a high-speed mixer for 3 minutes to 6 minutes to obtain a mixture;

b, feeding the mixture into a twin-screw extruder through a precisely metered feeding device, with a temperature of each section of a extruder screw being controlled between 170° C. and 220° C., a length-to-diameter ratio of the twin-screw extruder being 30 to 35, and a rotating speed of the screw being 300 revolutions/minute to 800 revolutions/minute, fully melting and mixing the materials under shearing, mixing and conveying of the screw, and then through extrusion, granulation and drying to obtain a flame-retardant HIPS particle; and c, adding the flame-retardant HIPS particle to an injection machine to mold into a sample strip to be tested, under injection conditions that a barrel temperature is 185° C. to 220° C., an injection pressure is 40 MPa to 60 MPa, and a flow is 40 cm$^3$/s to 70 cm$^3$/s.

Compared with the prior art, the present invention has the following beneficial effects:

(1) in the present invention, through a synergistic compounding of a brominated flame retardant and an auxiliary flame retardant, an amount of the brominated flame retardant is effectively reduced, reducing a cost for flame-retarding, through a composite flame-retardant mechanism of a gas phase and a condensation phase, a stable UL 94 (1.5 mm) V-0 flame-retardant class can be achieved; and (2) compared with the existing brominated flame-retardant HIPS, the flame-retardant HIPS material provided by the present invention has a low halogen content, low gas, and high cost performance ratio, which avoids excessive acid gas from forming air lines on the surface of parts, has a good appearance, and can be widely applied in the field of thin-walled parts, such as office equipment, video multimedia, household appliances and the like.

DESCRIPTION OF THE EMBODIMENTS

The present invention is further described by specific implementations hereinafter, the following embodiments are preferred implementations of the present invention, but the implementations of the present invention are not limited by the embodiments below.

Raw materials used in the present invention are as follows, which are all commercially available raw materials.

HIPS resin, PS 350 K, GPPC CHEMICAL CORPORATION, with a rubber content of 7 wt % to 11 wt %, and a melt flow rate of 5 g/min to 15 g/min under a load of 5 kg at 200° C.;

Brominated flame retardant:
decabromodiphenyl ethane, commercially available;
brominated epoxy, commercially available;
bromotriazine, commercially available;
imine bromide, commercially available;
auxiliary flame retardant 1: $R_1$, $R_2$ and $R_3$ are the same phosphoalkyl group (—P(CH$_3$)$_2$) or phosphoryl group (—PH$_2$O$_4$);
auxiliary flame retardant 2: $R_1$, $R_2$ and $R_3$ are the same silyl group (—SiH$_3$) or amino group (—NH$_2$);
lubricant: EBS B50, Ruichi Chemical;
flame-retardant synergist: diantimony trioxide, Yiyang Yincheng Mineral;
anti-dripping agent, 5935EF, 3M Corporation, USA.

Test Standards or Methods for Each Performance:

| Test item | Unit | Executive standard |
|---|---|---|
| Flame retardancy | Class | UL 94 |

Embodiments 1 to 8 and Comparative Examples 1 to 3: Preparation of the Flame-Retardant HIPS Material a, raw materials of each component were fully mixed according to a ratio in a high-speed mixer for 3 minutes to 6 minutes to obtain a mixture;

b, the mixture was fed into a twin-screw extruder through a precisely metered feeding device, with a temperature of each section of the extruder screw was controlled between 170° C. and 220° C., a length-to-diameter ratio of the twin-screw extruder was 30 to 35, and a rotating speed of the screw was 300 revolutions/minute to 800 revolutions/minute, the materials were fully melted and mixed under shearing, mixing and conveying of the screw, and then through extrusion, granulation and drying, a flame-retardant HIPS particle was obtained; and c, the flame-retardant HIPS particle was added to an injection machine to mold into a sample strip to be tested, under injection conditions that a barrel temperature was 185° C. to 220° C., an injection pressure was 40 MPa to 60 MPa, and a flow rate was 40 cm$^3$/s to 70 cm$^3$/s.

Performance tests of the flame-retardant HIPS material were carried out, and the data are shown in Table 1.

TABLE 1

Specific ratios (parts by weight) and test performance results of Embodiments 1 to 8 and Comparative Examples 1 to 3

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| PS 350K | 75.8 | 76.8 | 75.8 | 76.8 | 72.8 | 73.8 | 71.8 | 79.8 |
| Decabromodiphenyl ethane | 11 | 11 | 8 | 8 | | | | 11 |

TABLE 1-continued

Specific ratios (parts by weight) and test performance results of Embodiments 1 to 8 and Comparative Examples 1 to 3

| | | | | | | | | |
|---|---|---|---|---|---|---|---|---|
| Brominated epoxy | | | 3 | | | | 5 | |
| Bromotriazine | | | | 3 | 14 | | | |
| Imine bromide | | | | | | 14 | 10 | |
| Auxiliary flame retardant 1 | 4 | 3 | 4 | | 7 | | 7 | |
| Auxiliary flame retardant 2 | 3 | 3 | 3 | 6 | | 6 | | 3 |
| Diantimony trioxide | 5 | 5 | 5 | 5 | 5 | 5 | 5 | 5 |
| EBS B50 | 1 | 1 | 1 | 1 | 1 | 1 | 1 | 1 |
| 5935EF | 0.2 | 0.2 | 0.2 | 0.2 | 0.2 | 0.2 | 0.2 | 0.2 |
| Phosphorus element weight content (based on the entire flame-retardant HIPS material) ppm | 800 | 650 | 800 | 40 | 2850 | 30 | 2780 | 50 |
| Nitrogen element weight content (based on the entire flame-retardant HIPS material) ppm | 15310 | 15100 | 15200 | 45000 | 47000 | 25000 | 15310 | 18200 |
| Flame-retardant class (1.5 mm) | V-0 | V-0 | V-0 | V-0 | V-0 | V-0 | V-0 | V-0 |
| Air lines | No | No | No | No | No | No | No | No |

| | Comparative Example 1 | Comparative Example 2 | Comparative Example 3 |
|---|---|---|---|
| PS 350K | 76.8 | 76.8 | 76.8 |
| Decabromodiphenyl ethane | 8 | 17 | 15 |
| Brominated epoxy | | | |
| Bromotriazine | | | |
| Imine bromide | | | |
| Auxiliary flame retardant 1 | | | 2 |
| Auxiliary flame retardant 2 | | | |
| Diantimony trioxide | 5 | 5 | 5 |
| EBS B50 | 1 | 1 | 1 |
| 5935EF | 0.2 | 0.2 | 0.2 |
| Phosphorus element weight content (based on the entire flame-retardant HIPS material) ppm | 50 | 40 | 150 |
| Nitrogen element weight content (based on the entire flame-retardant HIPS material) ppm | 0 | 0 | 280 |
| Flame-retardant class (1.5 mm) | V-2 | V-0 | V-0 |
| Air lines | No | Obvious | Light |

It can be seen from comparison of the Embodiments and the Comparative examples in Table 1 that a combined action of the auxiliary flame retardant and different types of brominated flame retardants can achieve a V-0 flame-retardant effect, and the two have a synergistic compounding effect, which effectively reduces an amount of the brominated flame retardant and a cost for flame-retarding. After the compounding, not only the material can reach a stable UL 94 (1.5 mm) V-0 flame-retardant class, but also excessive acid gas forming air lines on the surface of parts is avoided, and a good appearance is obtained.

What is claimed is:

1. A flame-retardant HIPS material, comprising the following components in parts by weight: a HIPS resin of 90 parts to 67 parts; a brominated flame retardant of 10 parts to 15 parts; 1 part to 7 parts of an antimony-based flame-retardant synergist; and an auxiliary flame retardant of 3 parts to 7 parts, wherein the auxiliary flame retardant is a 1,3,5-triazine compound, which is a chemical substance or a derivative having the following structure:

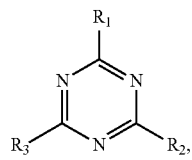

wherein $R_1$, $R_2$, $R_3$ are the same and represent —P$(C_6H_5)_2$, —P$(CH_3)_2$, —PH$_2O_4$, —PH$_2O_2$, —SiH$_3$, —SiCl$_3$, —SiOH$_2$, —SiHCl$_2$, —SiHO$_3$ or ((CH$_3$)$_5$Si)$_2$O.

2. The flame-retardant HIPS material according to claim 1, wherein the HIPS resin is a butadiene-styrene graft copolymer with a rubber content of 7 wt % to 11 wt % based on a total weight of the entire HIPS resin.

3. The flame-retardant HIPS material according to claim 1, wherein the HIPS resin has a melt flow rate of 5 g/min to 15 g/min under a load of 5 kg at 200° C.

4. The flame-retardant HIPS material according to claim 1, wherein the brominated flame retardant is one of or a mixture of more of decabromodiphenyl ethane, brominated epoxy, tetrabromobisphenol A, tris(tribromophenoxy)triazine, octabromoether and imine bromide.

5. The flame-retardant HIPS material according to claim 1, wherein further comprising 0.01 part to 2 parts of an anti-dropping agent, and 0 part to 2 parts of a processing aid in parts by weight.

6. The flame-retardant HIPS material according to claim 5, wherein the antimony-based flame-retardant synergist is one or more of diantimony trioxide, diantimony pentoxide, sodium antimonate and antimony phosphite; the anti-dropping agent is a perfluoropolyolefin or a perfluoropolyolefin coated with styrene-acrylonitrile; and the processing aid is one or more of an antioxidant, a lubricant and an anti-photothermal oxidant.

7. The flame-retardant HIPS material according to claim 1, wherein a phosphorus element weight content is 30 ppm to 3,000 ppm based on a total weight of the flame-retardant HIPS material.

8. The flame-retardant HIPS material according to claim 1, wherein a nitrogen element weight content is 500 ppm to 50,000 ppm based on a total weight of the flame-retardant HIPS material.

9. A preparation method of the flame-retardant HIPS material according to claim 1, comprising the following steps:
step a, fully mixing raw materials of each component according to a ratio in a high-speed mixer for 3 minutes to 6 minutes to obtain a mixture;
step b, feeding the mixture into a twin-screw extruder through a precisely metered feeding device, with a temperature of each section of a extruder screw being controlled between 170° C. and 220° C., a length-to-diameter ratio of the twin-screw extruder being 30 to 35, and a rotating speed of the screw being 300 revolutions/minute to 800 revolutions/minute, fully melting and mixing the materials under shearing, mixing and conveying of the screw, and then through extrusion, granulation and drying to obtain a flame-retardant HIPS particle; and
step c, adding the flame-retardant HIPS particle to an injection machine to mold into a sample strip to be tested, under injection conditions that a barrel temperature is 185° C. to 220° C., an injection pressure is 40 MPa to 60 MPa, and a speed is 40 cm$^3$/s to 70 cm$^3$/s.

10. A preparation method of the flame-retardant HIPS material according to claim 2, comprising the following steps:
step a, fully mixing raw materials of each component according to a ratio in a high-speed mixer for 3 minutes to 6 minutes to obtain a mixture;
step b, feeding the mixture into a twin-screw extruder through a precisely metered feeding device, with a temperature of each section of a extruder screw being controlled between 170° C. and 220° C., a length-to-diameter ratio of the twin-screw extruder being 30 to 35, and a rotating speed of the screw being 300 revolutions/minute to 800 revolutions/minute, fully melting and mixing the materials under shearing, mixing and conveying of the screw, and then through extrusion, granulation and drying to obtain a flame-retardant HIPS particle; and
step c, adding the flame-retardant HIPS particle to an injection machine to mold into a sample strip to be tested, under injection conditions that a barrel temperature is 185° C. to 220° C., an injection pressure is 40 MPa to 60 MPa, and a speed is 40 cm$^3$/s to 70 cm$^3$/s.

11. A preparation method of the flame-retardant HIPS material according to claim 3, comprising the following steps:
step a, fully mixing raw materials of each component according to a ratio in a high-speed mixer for 3 minutes to 6 minutes to obtain a mixture;
step b, feeding the mixture into a twin-screw extruder through a precisely metered feeding device, with a temperature of each section of a extruder screw being controlled between 170° C. and 220° C., a length-to-diameter ratio of the twin-screw extruder being 30 to 35, and a rotating speed of the screw being 300 revolutions/minute to 800 revolutions/minute, fully melting and mixing the materials under shearing, mixing and conveying of the screw, and then through extrusion, granulation and drying to obtain a flame-retardant HIPS particle; and
step c, adding the flame-retardant HIPS particle to an injection machine to mold into a sample strip to be tested, under injection conditions that a barrel temperature is 185° C. to 220° C., an injection pressure is 40 MPa to 60 MPa, and a speed is 40 cm$^3$/s to 70 cm$^3$/s.

12. A preparation method of the flame-retardant HIPS material according to claim 4, comprising the following steps:
step a, fully mixing raw materials of each component according to a ratio in a high-speed mixer for 3 minutes to 6 minutes to obtain a mixture;
step b, feeding the mixture into a twin-screw extruder through a precisely metered feeding device, with a temperature of each section of a extruder screw being controlled between 170° C. and 220° C., a length-to-diameter ratio of the twin-screw extruder being 30 to 35, and a rotating speed of the screw being 300 revolutions/minute to 800 revolutions/minute, fully melting and mixing the materials under shearing, mixing and conveying of the screw, and then through extrusion, granulation and drying to obtain a flame-retardant HIPS particle; and
step c, adding the flame-retardant HIPS particle to an injection machine to mold into a sample strip to be tested, under injection conditions that a barrel temperature is 185° C. to 220° C., an injection pressure is 40 MPa to 60 MPa, and a speed is 40 cm$^3$/s to 70 cm$^3$/s.

13. A preparation method of the flame-retardant HIPS material according to claim 5, comprising the following steps:
step a, fully mixing raw materials of each component according to a ratio in a high-speed mixer for 3 minutes to 6 minutes to obtain a mixture;
step b, feeding the mixture into a twin-screw extruder through a precisely metered feeding device, with a temperature of each section of a extruder screw being controlled between 170° C. and 220° C., a length-to-diameter ratio of the twin-screw extruder being 30 to 35, and a rotating speed of the screw being 300 revolutions/minute to 800 revolutions/minute, fully melting and mixing the materials under shearing, mixing and conveying of the screw, and then through extrusion, granulation and drying to obtain a flame-retardant HIPS particle; and step c, adding the flame-retardant HIPS particle to an injection machine to mold into a sample strip to be tested, under injection conditions that a barrel temperature is 185° C. to 220° C., an injection pressure is 40 MPa to 60 MPa, and a speed is 40 cm$^3$/s to 70 cm$^3$/s.

14. A preparation method of the flame-retardant HIPS material according to claim 6, comprising the following steps:

step a, fully mixing raw materials of each component according to a ratio in a high-speed mixer for 3 minutes to 6 minutes to obtain a mixture;

step b, feeding the mixture into a twin-screw extruder through a precisely metered feeding device, with a temperature of each section of a extruder screw being controlled between 170° C. and 220° C., a length-to-diameter ratio of the twin-screw extruder being 30 to 35, and a rotating speed of the screw being 300 revolutions/minute to 800 revolutions/minute, fully melting and mixing the materials under shearing, mixing and conveying of the screw, and then through extrusion, granulation and drying to obtain a flame-retardant HIPS particle; and step c, adding the flame-retardant HIPS particle to an injection machine to mold into a sample strip to be tested, under injection conditions that a barrel temperature is 185° C. to 220° C., an injection pressure is 40 MPa to 60 MPa, and a speed is 40 cm$^3$/s to 70 cm$^3$/s.

15. A preparation method of the flame-retardant HIPS material according to claim 7, comprising the following steps:

step a, fully mixing raw materials of each component according to a ratio in a high-speed mixer for 3 minutes to 6 minutes to obtain a mixture;

step b, feeding the mixture into a twin-screw extruder through a precisely metered feeding device, with a temperature of each section of a extruder screw being controlled between 170° C. and 220° C., a length-to-diameter ratio of the twin-screw extruder being 30 to 35, and a rotating speed of the screw being 300 revolutions/minute to 800 revolutions/minute, fully melting and mixing the materials under shearing, mixing and conveying of the screw, and then through extrusion, granulation and drying to obtain a flame-retardant HIPS particle; and step c, adding the flame-retardant HIPS particle to an injection machine to mold into a sample strip to be tested, under injection conditions that a barrel temperature is 185° C. to 220° C., an injection pressure is 40 MPa to 60 MPa, and a speed is 40 cm$^3$/s to 70 cm$^3$/s.

16. A preparation method of the flame-retardant HIPS material according to claim 8, comprising the following steps:

step a, fully mixing raw materials of each component according to a ratio in a high-speed mixer for 3 minutes to 6 minutes to obtain a mixture;

step b, feeding the mixture into a twin-screw extruder through a precisely metered feeding device, with a temperature of each section of a extruder screw being controlled between 170° C. and 220° C., a length-to-diameter ratio of the twin-screw extruder being 30 to 35, and a rotating speed of the screw being 300 revolutions/minute to 800 revolutions/minute, fully melting and mixing the materials under shearing, mixing and conveying of the screw, and then through extrusion, granulation and drying to obtain a flame-retardant HIPS particle; and step c, adding the flame-retardant HIPS particle to an injection machine to mold into a sample strip to be tested, under injection conditions that a barrel temperature is 185° C. to 220° C., an injection pressure is 40 MPa to 60 MPa, and a speed is 40 cm$^3$/s to 70 cm$^3$/s.

* * * * *